United States Patent Office 3,702,279
Patented Nov. 7, 1972

3,702,279
FIBROUS THERMAL INSULATION AND METHOD FOR PREPARING SAME
Zane L. Ardary, Kingston, Tenn., and David H. Sturgis, Muskegon, Mich., assignors to the United States of America as represented by the United States Atomic Energy Commission
No Drawing. Filed Apr. 7, 1971, Ser. No. 132,209
Int. Cl. B32b 17/02; C03b 29/00
U.S. Cl. 161—170                                            9 Claims

ABSTRACT OF THE DISCLOSURE

A low-density thermal insulation usable at high temperatures in oxidizing atmospheres is prepared by pulp molding a slurry of inorganic fibers, impregnating the molded fibrous mass with a binder of an inorganic sol, gelatinizing the sol, curing the gelatinized binder, drying the composite, and thereafter firing the composite for sintering the binder.

---

The present invention relates generally to inorganic, low-density, fibrous thermal insulation, and more particularly to the manufacture of such insulation. This invention was made in the course of, or under, a contract with the U.S. Atomic Energy Commission.

Low-density carbon-bonded cellular and fibrous thermal insulation possess weight and strength properties that make the insulation particularly suitable for use in many aerospace and other high temperature applications. However, since oxidants deleteriously affect carbon at relatively high temperatures the use of carbon-bonded insulation subject to such temperatures is restricted to environments in which a reducing or neutral atmosphere may be maintained.

Accordingly, it is the primary aim or objective of the present invention to provide a low-density thermal insulation which possesses a low thermal conductivity coefficient, high-temperature capabilities, strength, and fabrication characteristics that compare favorably with carbon-bonded cellular and fibrous insulation and which can be employed at high temperatures in oxygen-containing environments that would cause destruction of similarly disposed carbon-bonded insulation. The thermal insulation of the present invention consists primarily of an inorganic matrix binding together discrete inorganic fibers and is provided by impregnating a formed structure of inorganic fibers with a matrix-forming inorganic sol which is then gelatinized and cured with the resulting composite being subsequently dried and fired at a temperature adequate to sinter the particles providing the matrix.

Other and further objects of the invention will be obvious upon an understanding of the illustrative method about to be described, or will be indicated in the appended claims, and various advantages not referred to herein will occur to one skilled in the art upon employment of the invention in practice.

Described generally, the inorganic thermal insulation of the present invention is a composite of inorganic fibers joined together by a sintered inorganic binder. The thermal insulation may be prepared by practicing the steps of forming an aqueous slurry of discrete inorganic fibers, molding the slurry into a desired configuration, impregnating the fibrous mass with an inorganic sol, dewatering the sol, polymerizing or gelatinizing the sol to form a rigid gel which inhibits the migration of the impregnant or binder in the fibrous mass, curing the gel in the resulting composite, drying the latter, and thereafter heating the composite to a temperature sufficient to sinter the binder and thereby join the fibers in the composite.

The inorganic sol-gel binder used to form the fiber-joining matrix may be silica which can be prepared by the hydrolysis of a silicon compound in the presence of an acid or basic salt and water as is well known in the art. For example, silica sols or colloidal silica dispersions formed by the hydrolysis of silicon compounds including the chlorides, fluorides, and esters of orthosilicic acid such as methyl silicate or ethyl silicate may be used. In addition, sols may also be formed by the ion exchange removal of sodium ions from sodium silicate solutions. The sol as a liquid is drawn by vacuum into the molded fibrous mass and dewatered. This vacuum impregnating procedure provides a wicking action for effecting the wetting of the fibrous mass in a uniform manner to cause a uniform distribution of the binder within the fibrous mass.

The viscosity and concentration of the impregnating solution may be selectively controlled by employnig a suitable diluent such as water. When using ethyl silicate as the binder source the immiscibility thereof with water requires that a coupling agent such as alcohol (ethanol) be used to effect the desired hydrolysis and dilution of the sol. Upon completion of the binder-impregnating step and the removal of excess water and alcohol, if used, the sol is converted from a liquid state to a rigid gel by contacting the former with a basic salt, e.g., $(NH_4)_2CO_3$, a hydroxide, e.g., NaOH, a suitable electrolyte, or a gas such as anhydrous ammonia gas. The forming of a rigid gel prevents binder migration by wicking toward the surface of the composite during the drying step.

The formation of the thermal insulation is preferably achieved by forming a slurry of the fibers and then molding the fibers into a desired configuration. The slurry may be produced by combining the fibers with water or any other easily-removed liquid. As will be pointed out in greater detail below, vacuum is preferably used to hold the molded fibers in place while withdrawing a portion of the water from the slurry. The fibers used in the composite are preferably of the same material as that of the matrix, i.e., silica. Fibers of an average length of about 0.125 to 0.50 inch and average diameters of about 0.5 to 2.0 microns may be satisfactorily employed in the composite. If desired, fibers other than silica fibers may be used to form the composite.

The thermal insulation may incorporate opacifiers to provide infrared absorption and thereby increase the efficiency of the insulation. Suitable opacifying materials include titanium oxide and the like. The opacifier, in particulate form, is combined with the fiber slurry prior to the molding step to assure uniform distribution of the opacifier in the fibrous mass when the fibers are impregnated with the sol. The particle size of the opacifier may be in the range of about 1 to 5 microns. Normally, about 5 to 15 weight percent of the insulation may be provided by the opacifier to achieve the desired infrared absorbency.

As pointed out above, the inorganic binder is preferably silica derived from sols prepaed by methods mentioned above, all providing essentially similar results. Accordingly, with this understanding and for the purpose of describing the invention in a clear manner the following detailed description is directed to the use of a silica sol formed by the hydrolysis of ethyl silicate.

The method of forming the composites of the thermal insulation is preferably a pulp molding operation in which the fibrous slurry is molded in a suitably configured container or mold coupled to a suitable high volume vacuum source which provides for the removal of excess water and alcohol from the slurry, facilitates the molding, and holds the molded fibers in place. The vacuum is also utilized during the impregnating step in which the sol is introduced in the container and drawn into the interstices of the fibrous mass. The subsequent gelatinization of the binder to provide a rigid gel is achieved by introducing a basic gas, salt or hydroxide such as mentioned above into the mass. Suitable results have been achieved by employing a conventional pressure-vacuum impregnating procedure for this step. Upon completing the gelatinization operation the composite may be removed from the container and placed in a suitable vapor retaining structure, such as a plastic bag, which is sealed and placed in a heating recetpacle where the composite may be heated to a temperature of about 95° C. for a duration of about 1 to 5 hours for curing the binder and thereby further rigidifying the gel. The composite may then be removed from the confining structure and heated in air at a temperature above room temperature up to 95° C. for a duration (depending on the size of the article) necessary to remove all uncombined water, i.e., excess water. The dried composite is then fired in air or another suitable oxidizing medium at a temperature of 600 to 1000° C. for a duration of one hour or more depending on the size of the composite but at least sufficient to assure that the interior of the composite has reached the desired firing temperature. This firing step sinters together the particulates in the binder to form a matrix in which the fibers are firmly held. The sintering step effects the burnout of any volatile organic materials present in the composites and effectively shrinks the binder about the fibers to assure that further shrinkage of the insulation does not occur during high temperature use. The resulting thermal insulation is readily machined into any desired final configuration.

The thermal conductivity coefficient (K factor) of the insulation is in a range of about 0.40 to 0.50 B.t.u.-in./hr.-F°-ft.$^2$ at a temperature of 1000° F. which corresponds favorably with known high temperature thermal insulations using carbonaceous binders. The bulk density of the insulation is in the range of about 10–25 lbs. per ft.$^3$ depending upon the binder content which may provide 5 to 20 weight percent of the insulation. The compressive strength of the insulation ranges from about 20 p.s.i. for the low-density insulation up to about 200 p.s.i. for the high-density insulation. With the use of a smaller quantity of binder and/or omission of some of the opacifier insulation of a lesser density may be readily fabricated but the structural integrity of the insulation may not be adequate for some applications and machining operations when using marginal quantities of binder.

In order to provide a clear understanding of the method of forming thermal insulation in accordance with the present invention an illustartive example is set forth below.

EXAMPLE

A fiber slurry formed of 190 grams of silica fibers 0.25 inch in length by 0.5-micron in diameter along with 10 grams of 5-micron titanium oxide particles and 30 gallons of water was pulp molded under the influence of a high volume vacuum source. A silica sol was then prepared by mixing 12.5 ml. of ethyl silicate (20 grams $SiO_2$/100 cc.), 12.5 ml. of absolute ethyl alcohol, 1.25 ml. of hydrochloric acid and 98.75 ml. of water. The resulting sol was diluted to 1500 ml. with absolute ethyl alcohol with the resulting liquid being used ot impregnate the pulp molded composite by using the vacuum for drawing the solution into the composite. The vacuum was maintained on the composite until essentially all excess water was drawn out. The sol in the composite was converted to a rigid gel by drawing and forcing anhydrous ammonia gas through the composite for a duration of 10 minutes at an average flow rate of approximately 5 c.f.m. The composite was then removed from the mold, placed in an airtight plastic bag and cured at 95° C. for 5 hrs. The cured composite was removed from the plastic bag, dried at 95° C. for 16 hrs. and subsequently fired at 1000° C. for one hour in an air atmosphere. The resulting fired composite was of a density of 13.1 lbs. per ft.$^3$, possessed a thermal conductivity coefficient of 0.40 B.t.u.-in./hr.-F. °-ft.$^2$ at a temperature of 1000° F., and had a compressive strength of approximately 50 p.s.i.

It will be seen that the present invention provides an inorganic insulation which is suitable for use at high temperatures in oxidizing atmospheres particularly where weight is of considerable importance. Other inorganic binders and fibers are usable in the method of the present invention to form the desired thermal insulation. For example, a gelatinizationable sol of zirconia may be used in the method for forming the matrix joining together zirconia fibers. Further, any inorganic material which can be converted from a sol to a gel in a manner similar to that described above may be used as the binding material for any suitable fibrous refractory material.

What is claimed is:

1. A method of preparing an inorganic thermal insulation of a density less than about 25 pounds per cubic foot comprising the steps of molding a slurry of inorganic fibers, impregnating the molded fibers with an inorganic sol to provide a binder for joining the fibers together, gelatinizing the binder to form a gel of sufficient rigidity to prevent the migration of the binder, curing the binder in the resulting composite, drying the composite, and thereafter heating the composite in an oxidizing atmosphere to a temperature sufficient to sinter the binder.

2. The method of preparing an inorganic thermal insulation as claimed in claim 1, wherein the fibers are silica fibers of a length in the range of about 0.125 to 0.50 inch and a diameter in the range of about 0.5 to 2.0 microns, and wherein the inorganic sol is a liquid mixture of hydrated silica.

3. The method of preparing an inorganic thermal insulation as claimed in claim 2, wherein the hydrated silica is provided by a solution of ethyl silicate hydrated with the aid of alcohol.

4. The method of preparing an inorganic thermal insulation as claimed in claim 2, wherein the sintered binder provides 5 to 20 weight percent of the insulation.

5. The method of preparing an inorganic thermal insulation as claimed in claim 2, including the additional step of dispersing titanium oxide in the slurry with the titanium oxide being of a particle size in the range of 1 to 5 microns and in an amount sufficient to provide 5 to 15 weight percent of the insulation.

6. The method of preparing an inorganic thermal insulation as claimed in claim 2, including the additional step of withdrawing liquid from the slurry during the molding, impregnating, and gelatinizing steps.

7. The method of preparing an inorganic thermal insulation as claimed in claim 6, wherein the curing of the binder is provided by confining the vapors about the composite and heating the latter to a temperature sufficient to effect said curing, wherein the drying of the composite is provided by heating the composite in air to a temperature above room temperature up to about 95° C., and wherein said temperature for sintering the composite is in the range of about 600 to 1000° C.

8. An inorganic thermal insulation having a bulk density in the range of about 10 to 25 pounds per cubic foot and a thermal conductivity coefficient in the range of about 0.40 to 0.50 B.t.u.-in./hr.-F. °-ft.$^2$ at a temperature of 1000° F., comprising silica fibers within a sintered silica matrix providing 5 to 20 weight percent of the insulation.

9. The inorganic thermal insulation claimed in claim 8, wherein titanium oxide particulates are dispersed within the insulation with the particulates being in a size range of 1 to 5 microns and providing 5 to 15 weight percent of the insulation.

References Cited

UNITED STATES PATENTS

| | | | |
|---|---|---|---|
| 3,220,915 | 11/1965 | Shannon | 161—170 |
| 3,296,060 | 6/1967 | Seitzinger | 161—170 |
| 3,551,266 | 12/1970 | Webb | 161—193 |

WILLIAM J. VAN BALEN, Primary Examiner

U.S. Cl. X.R.

156—89; 161—193